United States Patent [19]

Yanase

[11] Patent Number: 4,729,025
[45] Date of Patent: Mar. 1, 1988

[54] JITTER CORRECTION CIRCUIT

[75] Inventor: Shuji Yanase, Gifu, Japan

[73] Assignee: Sanyo Electric Co., Ltd., Osaka, Japan

[21] Appl. No.: 921,083

[22] Filed: Oct. 21, 1986

[30] Foreign Application Priority Data

| Nov. 6, 1985 | [JP] | Japan | 60-171067[U] |
| Nov. 6, 1985 | [JP] | Japan | 60-171068[U] |
| Feb. 10, 1986 | [JP] | Japan | 61-27669 |
| Feb. 12, 1986 | [JP] | Japan | 61-28142 |

[51] Int. Cl.$^4$ .......................... H04N 5/95; H04N 9/475
[52] U.S. Cl. ..................................... 358/166; 358/320; 358/337
[58] Field of Search .............. 358/166, 160, 167, 336, 358/337, 339, 340, 342, 13, 19, 312, 320, 321, 324

[56] References Cited

U.S. PATENT DOCUMENTS

| 4,212,027 | 7/1980 | Lemoine | 358/19 |
| 4,635,097 | 1/1987 | Tatami | 358/19 |
| 4,646,136 | 2/1987 | Kouyama | 358/19 |

OTHER PUBLICATIONS

"High Definition Television Systems: Desirable Standards, Signal Forms, and Transmission Systems", by Takashi Fujio, IEEE Transactions on Communications, vol. Com-29, No. 12, Dec., 1981, pp. 1882-1891.

"Digital Technology in Broadcasting", pp. 163-167, issued by Nippon Hoso Shuppan Kyokai.

"Nikkei Electronics", issued by Nikkei McGraw-Hill, Mar. 12, 1984, pp. 112-116.

"New Transmission System of High-Quality Television", Jun. 6, 1984, from the meeting of NHK General Tech. Institute & NHK Broadcasting Scientific Basic Inst.

"Radio Wave Science", issued by Nippon Hoso Shuppan Kyokai, Apr. 1, 1984, pp. 103-108.

Primary Examiner—Tommy P. Chin
Attorney, Agent, or Firm—Armstrong, Nikaido, Marmelstein & Kubovcik

[57] ABSTRACT

A jitter correction circuit is a circuit for suppressing a jitter contained in a reproduced digital signal. This jitter correction circuit comprises a phase-locked loop circuit comprising a phase comparing circuit (9), a second low-pass filter (10), a second voltage control oscillator (11) and a second frequency dividing circuit (12). The phase-locked loop circuit provides an oscillation output which causes little influence to a jitter component contained in a reproduced signal digitally converted by an analog-to-digital converting circuit (1). The digitally converted reproduced signal is resampled in a sampling pulse generating circuit (13) and a resampling circuit (7) which operates based on the above stated phase-locked loop circuit. As a result, the resampling circuit (7) provides an output having a considerably decreased amount of jitter.

10 Claims, 15 Drawing Figures

JITTER CORRECTION CIRCUIT

BACKGROUND OF THE INVENTION

1. Field of the Invention

The present invention relates to a jitter correction circuit for suppressing a jitter in a digital video signal converted from an analog video signal.

2. Description of the Prior Art

A broadcasting system for providing a stable video signal does not operate if a video signal to be reproduced containing a jitter component is input thereto. Therefore, a prior art document, e.g., "Digital Technology in Broadcasting", pp. 163–167, issued by Nippon Hoso Shuppan Kyokai proposes a jitter correction circuit of high precision for suppressing a jitter by utilizing a rapidly responsive digital memory.

However, the above stated conventional circuit has a complicated configuration, which unavoidably causes high manufacturing costs.

SUMMARY OF THE INVENTION

A primary object of the present invention is to provide a jitter correction circuit of a relatively simple configuration for suppressing a jitter.

According to an embodiment of the invention a jitter correction circuit comprises a first oscillation control circuit for providing a first oscillation output having a rapid frequency response characteristic according to phase deviation in a reproduced horizontal synchronizing signal; an analog-to-digital converting circuit for sampling the reproduced video signal based on the first oscillation output to provide digitally converted data; a second oscillation control circuit for providing a second oscillation output having a stable frequency response characteristic according to the phase deviation in the reproduced horizontal synchronizing signal or phase deviation in the first oscillation output; and resampling circuit for resampling the digitally converted data based on the second oscillation output.

Consequently, according to the above described embodiment of the invention, the reproduced video signal containing a jitter component is converted to digital data based on the first oscillation output containing a jitter component and the digital data thus obtained by analog-to-digital conversion is resampled based on the second oscillation output containing little jitter component.

According to another embodiment of the invention, a jitter correction circuit comprises: a serial-to-parallel converting circuit for reading digital data in synchronism with the first clock following a jitter so as to latch the data converted from serial data to parallel data in synchronism with a 1/n frequency divided pulse of the first clock; and a parallel-to-serial converting circuit for latching again the above stated latched parallel data in synchronism with a 1/n frequency divided pulse of the stable second clock so as to convert the parallel data to serial data based on the above stated second clock.

Consequently, according to the above described latter embodiment of the invention, a period for transferring data to the parallel-to-serial converting circuit can be made n times as long by the serial-to-parallel conversion and a jitter correction amount can be made n times as much.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Any of the below described embodiments of the invention uses an example of a jitter correction circuit which receives as an input signal a compressed video signal reproduced by a high-quality video disk player or the like. The compressed video signal is a signal obtained in a manner in which a color signal of a high-quality video signal is compressed and multipled on a time basis to compress the band thereof using a subnyquist sampling encode system. This compression method is a known technique described for example in (1) the technical journal "Nikkei Electronics" issued by Nikkei McGraw-Hill, Mar. 12, 1984, pp. 112–116, (2) the collection of technical papers for anniversary meeting of NHK General Technical Institute and NHK Broadcasting Scientific Basic Institute "New Transmission System of High-Quality Television", June 6, 1984 or (3) the technical journal "Radio Wave Science" issued by Nippon Hoso Shuppan Kyokai, Apr. 1, 1984, pp. 103–108.

The reproduced compressed video signal is usually input into a converting decoder so as to be converted to the initial high-quality video signal. The converting decoder converts the reproduced compressed video signal from the analog data to digital data based on a master clock having a phase locked to a horizontal synchronizing signal so that the high-quality video signal is formed based on the digital data.

Any of the below described embodiments suppresses a jitter component contained in the reproduced compressed video signal immediately after the above described analog-to-digital conversion of data. A jitter of the reproduced compressed video signal is decreased to an amount corresponding to less than a half of an analog-to-digital converting cycle of about 60n second because it is generally mitigated by a jitter correction mechanism in the video disk player.

In the following, a concrete construction of each embodiment will be described.

Figure 1:
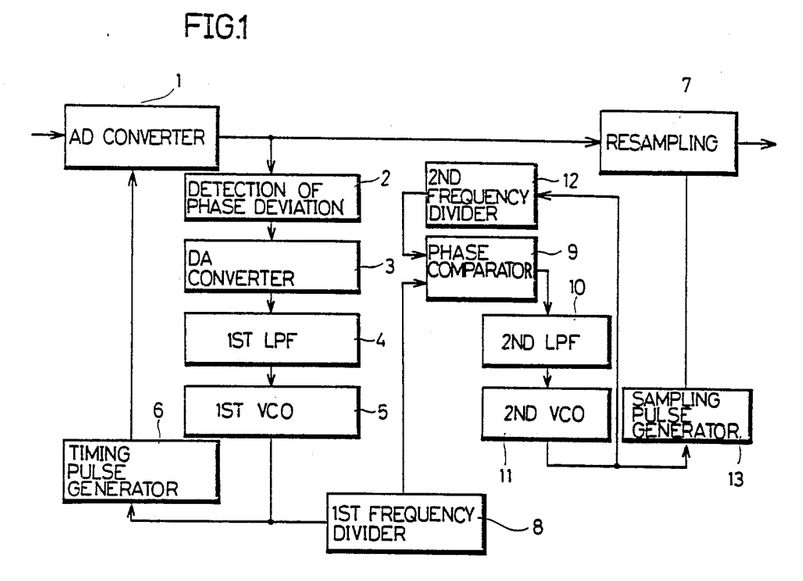
FIG. 1 is a circuit block diagram showing a first embodiment of the invention.

FIG. 1 is a circuit block diagram showing a first embodiment of the invention. In the first embodiment, an analog-to-digital converting circuit 1 converts, as shown in FIG. 1, an input reproduced compressed video signal to a digital signal of eight bits based on a clock pulse of 16.2 MHz. A phase deviation detection circuit 2 to which the digital signal is input latches the digital signal with a predetermined cycle of timing (correct horizontal synchronizing timing) defined by a frame synchronizing pulse and detects a deviation amount of the digital signal from a correct value so that data of phase deviation is provided. This data of phase deviation is converted to analog data in a digital-to-analog converting circuit 3 and the analog data is input to a first low-pass filter 4 for setting cut-off frequency to a value approximate to the horizontal synchronizing frequency. A first voltage control oscillation circuit 5 receiving the output of the first low-pass filter 4 as a control input has a center frequency of 32.4 MHz. The oscillation output of this circuit 5 is received by a timing pulse generating circuit 6, where it undergoes ½ frequency division. The ½ frequency divided output is supplied to the above stated analog-to-digital converting circuit 1 as a timing pulse (a first clock).

Thus, the analog-to-digital converting timing changes to dissolve phase deviation and as a result, a jitter component is generated in the digital signal converted in the analog-to-digital converting circuit 1.

Therefore, this embodiment is provided with a resampling circuit 7 so as to suppress from the jitter component of the digital signal, a jitter component involving a considerable change, namely, a jitter component of high frequency. A sampling pulse (a second clock) of the resampling circuit 7 is formed in the following manner. First, the oscillation output of the first voltage control oscillation circuit 5 undergoes ⅛ frequency division in the first frequency dividing circuit 8 and the ⅛ frequency divided output is supplied as a reference input to a phase-locked loop (PLL) circuit comprising a phase comparing circuit 9, a second low-pass filter 10, a second voltage control oscillation circuit 11 and a second frequency dividing circuit 12. This PLL circuit operates stably with a slow response characteristic. An output of phase comparison provided by the phase comparing circuit 9 is supplied to the second voltage control oscillation circuit 11 through the second low-pass filter 10 having a cut-off frequency of about 10 Hz. The second frequency dividing circuit 12 applies ⅛ frequency division to the oscillation output of the circuit 11 so that a feedback loop of the PLL circuit is formed. Thus, the oscillation output is stably provided and undergoes ½ frequency division in the sampling pulse generating circuit 13 so that the ½ frequency divided output is used as a sampling pulse of the above stated resampling circuit 7.

Figure 2:
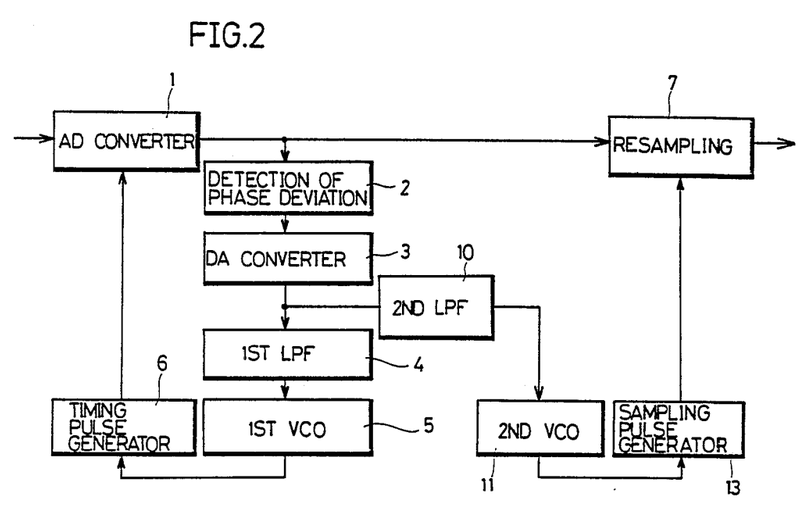
FIG. 2 is a circuit block diagram showing a second embodiment of the invention.

Although the above described first embodiment comprises the PLL circuit for forming a sampling pulse, a jitter correction circuit has a simpler construction as shown in FIG. 2 as the second embodiment, in which the output of the digital-to-analog converting circuit 3 is supplied directly to the second low-pass filter 10 to control the oscillation of the second voltage control oscillation circuit 11.

In the above described first embodiment, as the cut-off frequency of the second low-pass filter 10 decreases for the purpose of making stable the oscillation frequency of the second voltage control oscillation circuit 11, the output of the second low-pass filter 10 changes considerably in a range of low frequency although such change is also dependent on the jitter characteristic of the input reproduced compressed video signal. Once such changed is caused, such change is constantly produced, causing perturbation to the stable oscillation state. For this reason, the third embodiment shown in FIGS. 3 and 4 suppresses change of the output level of the second low-pass filter 10 to attain more stable oscillation of the second voltage control oscillation circuit 11.

Figure 3:
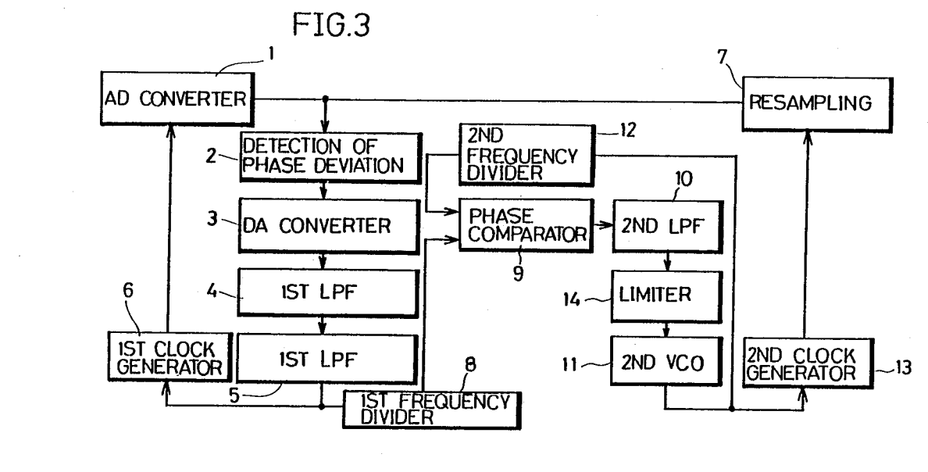
FIG. 3 is a circuit block diagram showing a third embodiment of the invention.

Referring to FIG. 3, the resampling circuit 7 samples the digital data by the stable second clock. The second clock is provided from a stable oscillation circuit in the PLL circuit. More specifically, first, the first frequency dividing circuit 8 which receives the oscillation output of the first voltage control oscillation circuit supplies the ⅛ frequency divided output to the phase comparing circuit 9 as a reference input. The second frequency dividing circuit 12 which receives a feedback output supplies the ⅛ frequency divided output to the above stated phase comparing circuit 9 as a comparison input. The output of the phase comparing circuit 9 is supplied to the second low-pass filter 10 which sets the cut-off frequency to about 10 Hz. The output of the second low-pass filter 10 is supplied to a limiter circuit 14 so that the level thereof is limited.

Figure 4:
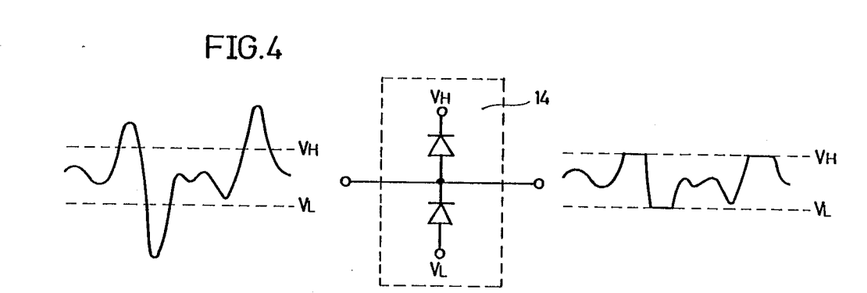
FIG. 4 is a circuit block diagram of a main portion in FIG. 3.

The limiter circuit 14 is connected with two diodes for signal line as shown in the center of FIG. 4 so that high voltage (VH) and low voltage (VL) are applied thereto, respectively. Consequently, an upper limit and a lower limit of the input signal shown in the left part of FIG. 4 are cut by the limiter circuit 14 and the output of the limiter circuit 14 is provided nearly within a limited range defined by VL and VH as shown in the right part of FIG. 4. As a result, the second voltage control oscillation circuit 11 which receives the output of the limiter circuit 14 as a control input maintains a stable oscillation state by reducing a variable range of oscillation. Accordingly, the second clock generating circuit 13 which receives a stable oscillation output 32.4 MHz supplies to the resampling circuit 7 a stable second clock (a sampling pulse) which is ½ frequency divided.

Figure 5:
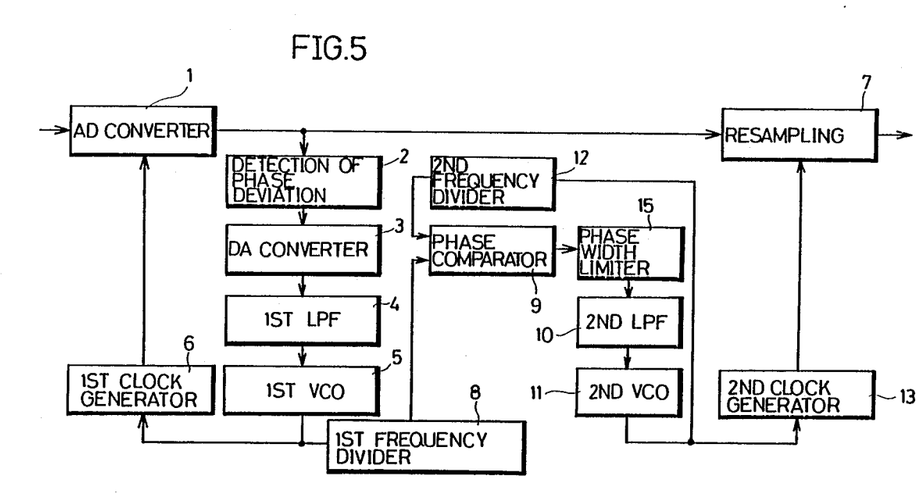
FIG. 5 is a circuit block diagram of a fourth embodiment of the invention.
Figure 6:
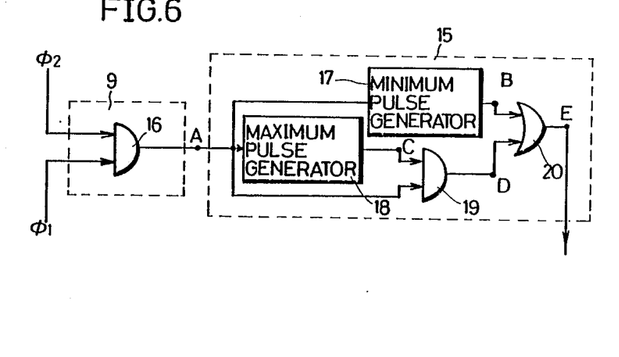
FIG. 6 is a circuit block diagram of a main portion in FIG. 5.
Figure 7:
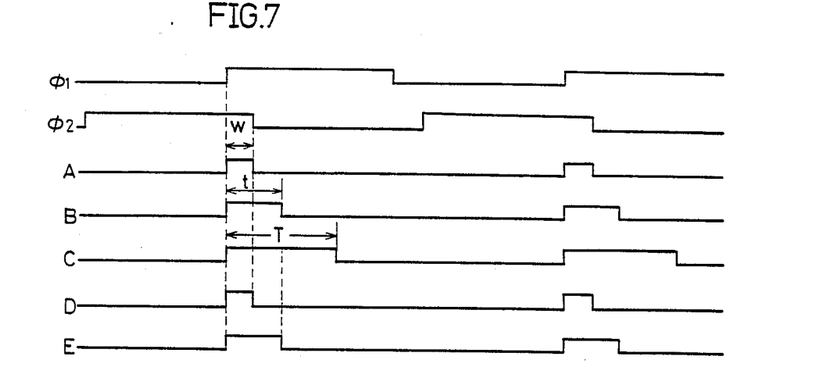
FIGS. 7, 8 and 9 are waveform diagrams of main components in FIG. 6.
Figure 8:
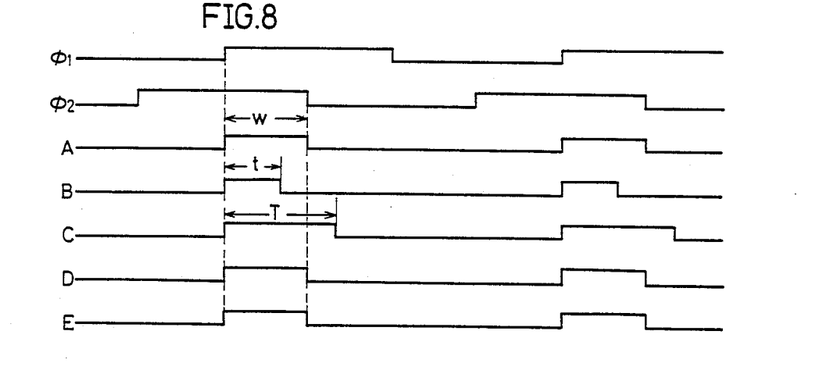
Figure 9:
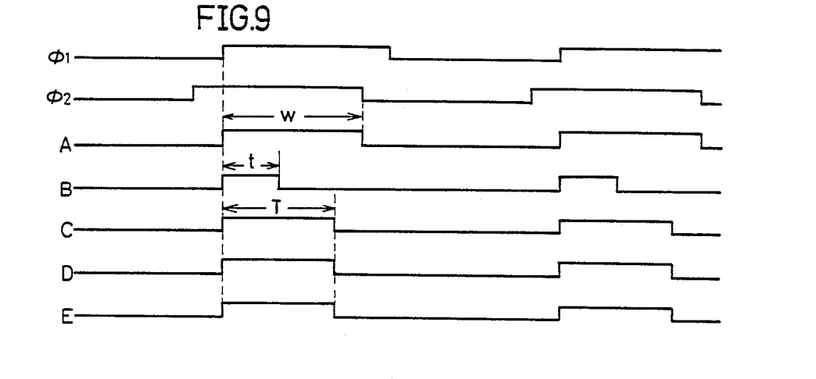

Although the output level of the low-pass filter is limited in the above described third embodiment, the present invention is not limited to such construction. For example, an output level of comparison may be limited at a stage preceding the second low-pass filter 10 as in the fourth embodiment shown in FIG. 5. FIG. 6 shows a concrete construction of the phase comparing circuit 9 and the pulse width limiting circuit 15 in FIG. 5. FIGS. 7, 8 and 9 are waveform diagrams thereof.

As is clear from FIG. 6, the phase comparing circuit 9 of the fourth embodiment comprises a first AND circuit 16 and a pulse width of an output A of the first AND circuit 16 serves as an output for phase comparison. A pulse width of the output A of the first AND circuit 16 changes in a range of 0 to 0.5 of the duty cycle. The above stated phase comparing circuit 9 supplies the output A of the first AND circuit 16 to a minimum pulse generating circuit 17 and to a maximum pulse generating circuit 18. The minimum pulse generating circuit 17 provides a minimum pulse B of a width t in synchronism with the rise of the output A of the first AND circuit 16 and the maximum pulse generating circuit 18 provides a maximum pulse C of a width T in synchronism with the rise of the output A of the first AND circuit 16. The maximum pulse C and the output A are supplied to a second AND circuit 19. As a result, the pulse width of the output D of the second AND circuit 19 is limited to T at most. The output D of the second AND circuit 19 and the minimum pulse B are supplied to an OR circuit 20. As a result, the pulse width of the OR output E is limited to at least t. FIG. 7 represents a case in which a pulse width W of the output A of the first AND circuit 16 is in a relation of $W<t<T$; FIG. 8 represents a case of $t<W<T$; and FIG. 9 represents a case of $t<T<W$.

Figure 10:
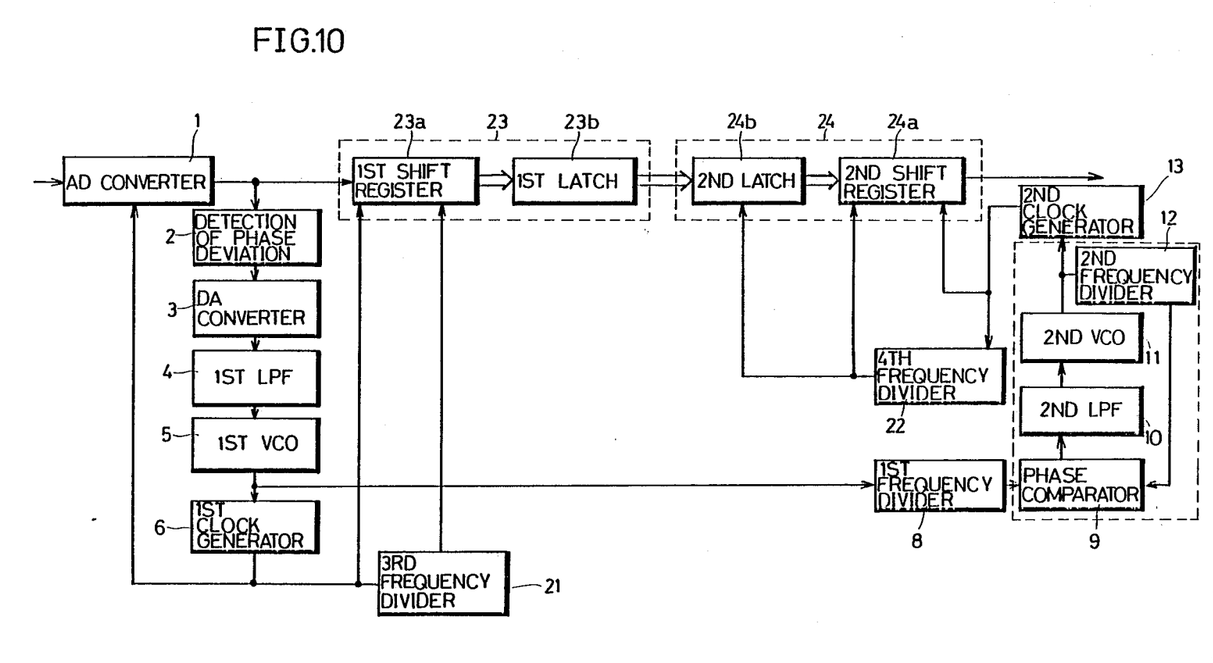
FIG. 10 is a circuit block diagram of a fifth embodiment of the invention.

FIG. 10 is a block diagram showing a fifth embodiment of the present invention.

In the fifth embodiment as well as in the above described respective embodiments, the present invention is applied to a jitter correction circuit for suppressing a jitter component after a compressed video signal reproduced by the high-quality video disk player has been converted to digital data. The digital data with suppressed jitter components is supplied to a converting decoder, where it is converted to a high-quality video signal.

A characteristic feature of the fifth embodiment is that a larger jitter component can be removed. More specifically, a jitter amount removed corresponds to at most $+30n$ seconds of a clock cycle in the first to fourth embodiments, while a jitter amount removed in the fifth embodiment is made n times as large as the above stated amount (n being a natural number).

In this fifth embodiment, 16 pieces of digital data converted from analog data are successively stored in a first shift register 23a of 16 bits using as a shift pulse a first clock rapidly responsive to the jitter component. On the other hand, a third frequency dividing circuit 21 which receives the first clock supplies a 1/16 frequency divided pulse to a first latch circuit 23b. The first latch circuit 23b latches the digital data in response to input of the 1/16 frequency divided pulse whenever the 16 pieces of digital data are stored in the shift register 23a. Accordingly, the latching cycle of the first latch circuit 23b is about $1\mu$ seconds and a phase error permitted in the second clock is $+500$ n seconds. Thus, the serial-to-parallel converting circuit 23 comprising the first shift register 23a and the first latch circuit 23b enlarges the permissible phase error of the second clock.

A jitter component in the output of the first latch circuit 23b is removed in the below described parallel-to-serial converting circuit 24. More specifically, the stable second clock with suppressed jitter components is converted to a 1/16 frequency divided pulse in a fourth frequency dividing circuit 22 and the 1/16 frequency divided pulse is supplied to a second latch circuit 24b and a second shift register 24a. Thus, the output of the first latch circuit 23b is latched in the second latch circuit 24b by the 1/16 frequency divided pulse and the output of the second latch circuit 24b is transferred to the second shift register 24a of 16 bits in response to the subsequent 1/16 frequency divided pulse. The digital data transferred to the second shift register 24a is provided serially in response to the second clock. The digital data thus provided contains suppressed jitter components. If this embodiment is adapted to make the second shift register 24a capable of loading data in a short period, the above described second latch circuit 24b is not necessarily needed.

In the above described fifth embodiment, the cut-off frequency of the second low-pass filter 10 is 10 Hz as in a conventional circuit. If the cut-off frequency of the low-pass filter is thus set to a low value for the purpose of making stable the oscillation frequency, the entire construction of the PLL circuit 25 is liable to be in a resonant state and the oscillation frequency might be changed considerably with a long cycle.

Figures 11, 13:
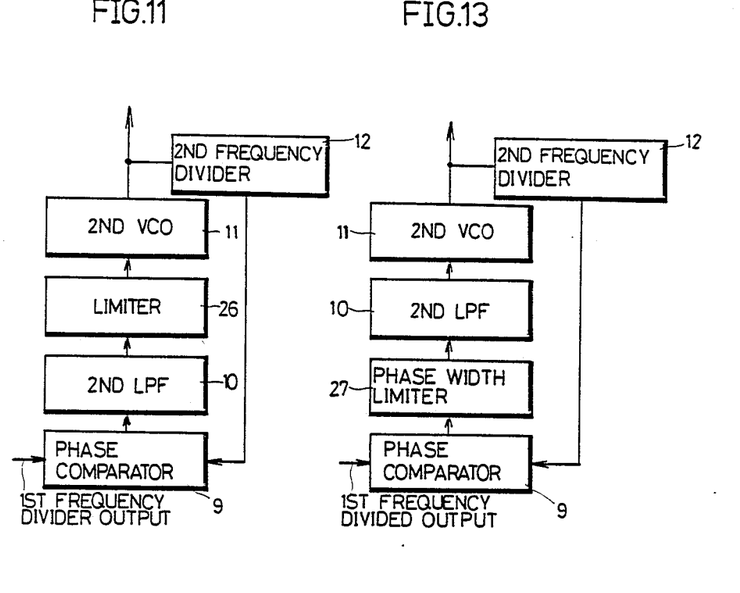
FIG. 11 is a circuit block diagram of a main portion of a sixth embodiment of the invention.
FIG. 13 is a circuit block diagram of a main portion of a seventh embodiment of the invention.
Figure 12:
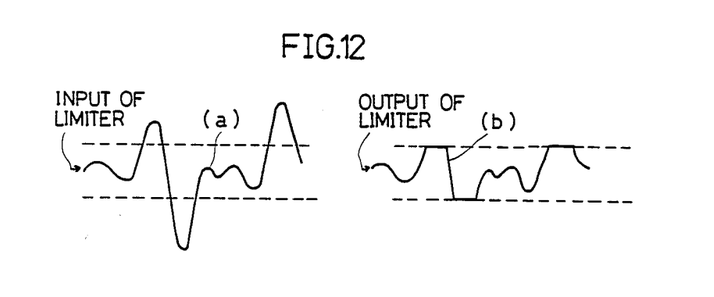
FIG. 12 is a waveform diagram of a main portion in FIG. 11.

Therefore, in a sixth embodiment, a limiter 26 for limiting amplitude is provided, as shown in FIG. 11, between a second low-pass filter 10 and a second variable oscillation circuit 11 in the PLL circuit 25 for generating the second clock. The limiter 26 limits the output of the low-pass filter as shown by (a) in FIG. 12 within a predetermined range and the output of the limiter 26 as shown by (b) in FIG. 12 is supplied to the above stated variable oscillation circuit 11 as a control input. As a result, the variable range of the oscillation frequency of the variable oscillation circuit 11 is limited and the PLL circuit 25 will never be brought into a resonant state.

In addition, the present invention is not limited to the construction of the sixth embodiment shown in FIG. 11 in which the output level of the low-pass filter is limited. The present invention may be adapted to limit change of the output of phase comparison at a stage preceding the second low-pass filter 10 as shown in FIG. 13 as the seventh embodiment. More specifically, the seventh embodiment comprises, at a stage preceding the second low-pass filter 10, a pulse width limiting circuit 27 functioning as an output limiting circuit so that the pulse width of the output of phase comparison is limited within a predetermined range.

Figure 14:
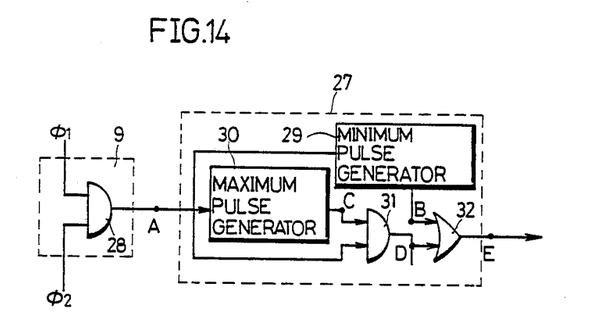
FIG. 14 is a circuit diagram showing more specifically the main portion in FIG. 13.
Figure 15:
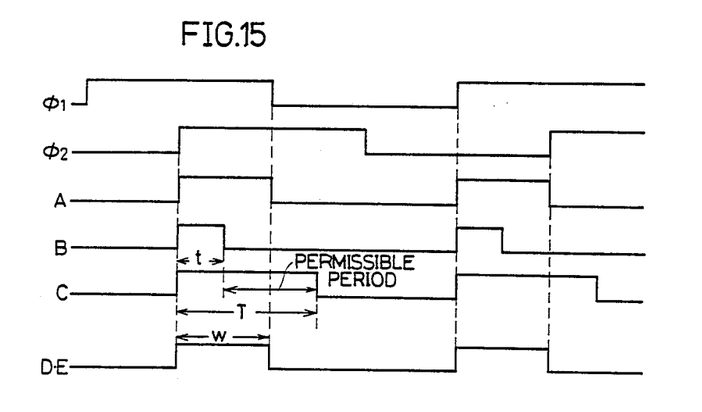
FIG. 15 is a waveform diagram of the signals of the main components in FIG. 14.

FIG. 14 shows specifically the construction of the phase comparing circuit 9 and the pulse width limiting circuit 27 and FIG. 15 is a waveform diagram of the main components thereof. The phase comparing circuit 9 comprises a first AND circuit 28 for receiving a first frequency divided output $\phi 1$ and a second frequency divided output $\phi 2$. Thus, the output A of comparison is provided as a change in the pulse width. Therefore, the pulse width limiting circuit 27 comprises a minimum pulse generating circuit 29 and a maximum pulse generating circuit 30 for forming a minimum pulse B and a maximum pulse C, respectively, in synchronism with the rise of the output A of phase comparison. The second AND circuit 31 receives the maximum pulse C and the output A of phase comparison to provide a second AND output D of a pulse width not exceeding the pulse width T of the maximum pulse C. The OR circuit 32 receives the minimum pulse B and the second AND output D to provide an OR output E larger than the pulse width t of the minimum pulse B and smaller than the pulse width T of the maximum pulse C. Thus, the pulse width w of the OR output E is in a relation of $t \leq w \leq T$. Consequently, when the OR output as the output of a limited pulse width is received by the second low-pass filter 10, the level thereof is limited within a predetermined range and the variable range of the oscillation frequency is also limited, whereby stable oscillation is attained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A jitter correction circuit comprising:

analog-to-digital converting circuit converts an input reproduced compressed video signal to a digital signal based on an input clock pulse;

a phase deviation detection circuit connected to said analog-to-digital converting circuit, said phase deviation detection circuit latches said digital signal and detects an amount of deviation of said digital signal, said phase deviation detection circuit producing a phase deviation;

digital-to-analog converting circuit converts said phase deviation to an analog signal;

a first low-pass filter connected to said digital-to-analog converting circuit, said first low-pass filter setting a cut-off frequency of said analog signal approximately equal to a horizontal synchronizing signal;

a first control oscillation circuit receives said horizontal synchronized signal from said first low-pass filter and provides a first oscillation output having a rapid frequency response characteristic based on said phase deviation of said horizontal synchronized signal contained in said reproduced compressed video signal;

a timing pulse generating circuit receives said first oscillation output from said first control oscillation circuit and produces said clock pulse input to said analog-to-digital converting circuit, wherein said analog-to-digital converting circuit samples said reproduced video signal based on said first oscillation output to provide said digital signal by analog-to-digital conversion;

a second oscillation control circuit provides a second oscillation output having a stable frequency response characteristic based on at least one of a phase deviation of said horizontal synchronized signal and a phase deviation of said first oscillation output; and a resampling circuit resamples said digital signal from said analog-to-digital converting circuit based on said second oscillation output.

2. A jitter correction circuit in accordance with claim 1, wherein said second oscillation control circuit comprises a phase-locked loop circuit comprising: a phase comparing circuit for receiving as a reference input at least one of said first oscillation output and a frequency divided output thereof and receiving as an input to be compared, at least one of said second oscillation output feedback and a frequency divided output thereof; a low-pass filter having a low cut-off frequency for receiving an output of said phase comparing circuit; a limiter for limiting an output of said low-pass filter within a predetermined range; and a variable oscillation circuit for receiving an output of said limiter as a control input.

3. A jitter correction circuit in accordance with claim 1, wherein said second oscillation control circuit comprises a phase-locked loop circuit comprising a phase comparing circuit for receiving as a reference input at least one of said first oscillation output and a frequency divided output thereof and receiving as an input to be compared at least one of said second oscillation output feedback and a frequency divided output thereof; a limiting circuit for limiting an output of said phase comparing circuit within a predetermined range; a low-pass filter having a low cut-off frequency for receiving an output of said limiting circuit; and a variable oscillation circuit for receiving an output of said low-pass filter as a control input.

4. A jitter correction circuit in accordance with claim 3, wherein said phase comparing circuit comprises an AND gate circuit for receiving a frequency divided output of said first oscillation output and a frequency divided output of said second oscillation output and said limiting circuit comprises a pulse width limiting circuit for limiting a pulse width of said output of said phase comparing circuit within a predetermined range.

5. A jitter correction circuit in accordance with claim 1, wherein said reproduced video signal comprises a reproduced compressed video signal obtained by compressing a band of a high-quality video signal.

6. A jitter correction circuit in accordance with claim 5, wherein said reproduced compressed video signal being reproduced for reproducing stored information optically.

7. A jitter correction circuit in accordance with claim 1, wherein said first control oscillation circuit controls frequency of said first oscillation output based on said digital signal with said first clock pulse for generating said reproduced horizontal synchronizing signal.

8. A jitter correction circuit comprising:

analog-to-digital converting circuit converts an input reproduced compressed video signal to a digital signal based on a first clock pulse input;

a phase deviation detection circuit connected to said analog-to-digital converting circuit, said phase deviation detection circuit latches said digital signal and detects an amount of deviation of said digital signal, said phase deviation detection circuit producing a phase deviation;

a digital-to-analog converting circuit converts said phase deviation to an analog signal;

a low-pas filter connected to said digital-to-analog converter, said low-pass filter setting a cut-off frequency of said analog signal to a horizontal synchronized signal;

a first oscillation control circuit receives said horizontal synchronized signal from said low-pass filter and provides a first oscillation output having a rapid frequency response characteristic based on said phase deviation of said horizontal synchronized signal contained in said reproduced compressed video signal;

a timing pulse generating circuit receives said first oscillation output from said first oscillation control circuit and produces said first clock pulse input to said analog-to-digital converting circuit, wherein said analog-to-digital converting circuit samples said reproduced video signal based on said first oscillation output to provide said digital signal by analog-to-digital conversion;

a second oscillation control circuit receives said first oscillation output as a reference input and provides a second clock having a stable frequency;

a serial-to-parallel converting circuit converts said digital signal as serial data from said analog-to-digial converting circuit to parallel data based on said first clock pulse from said timing pulse generating circuit, said serial-to-parallel converting circuit including a latching means for latching said converted parallel digital data based on a frequency divided output of said first clock pulse; and a parallel-to-serial converting circuit latches an output of said latching means based on a frequency divided output of said second clock from said second oscillation control circuit, said parallel-to-serial converting circuit converting said parallel data to serial data based on said second clock.

9. A jitter correction circuit in accordance with claim 8, wherein
said second oscillation control circuit comprises a phase-locked loop circuit comprising: a phase comparing circuit for receiving said first oscillation output as said reference input and said second clock feedback as a comparison input; an output limiting circuit for limiting an output of said phase comparing circuit within a predetermined range; a low-pass filter having a low cut-off frequency receiving an output of said output limiting circuit; and a variable oscillation circuit for receiving an output of said low-pass filter as a control input.

10. A jitter correction circuit in accordance with claim 8, wherein
said second oscillation control circuit comprises a phase-locked loop circuit comprising: a phase comparing circuit for receiving said first oscillation output as said reference input and said second clock feedback as a comparison input; a low-pass filter having a low cut-off frequency for receiving an output of said phase comparing circuit; a limiter for limiting an output level of said low-pass filter within a predetermined range; and a variable oscillation circuit for receiving an output of said limiter as a control input.

* * * * *